United States Patent [19]

Egawa

[11] Patent Number: 4,890,216

[45] Date of Patent: Dec. 26, 1989

[54] HIGH FREQUENCY POWER UNIT FOR GENERATING GAS LASERS

[75] Inventor: Akira Egawa, Yamanashi, Japan

[73] Assignee: Fanuc Ltd., Yamanashi, Japan

[21] Appl. No.: 207,091

[22] PCT Filed: Oct. 14, 1987

[86] PCT No.: PCT/JP87/00773

§ 371 Date: Jun. 13, 1988

§ 102(e) Date: Jun. 13, 1988

[87] PCT Pub. No.: WO88/02937

PCT Pub. Date: Apr. 21, 1988

[30] Foreign Application Priority Data

Oct. 15, 1986 [JP] Japan .................. 61-243206

[51] Int. Cl.[4] .......................................... H02M 7/00
[52] U.S. Cl. .................................. 363/124; 363/98
[58] Field of Search ............... 323/282, 288, 351; 363/95, 98, 124, 65

[56] References Cited

U.S. PATENT DOCUMENTS

| | | | |
|---|---|---|---|
| 3,560,834 | 2/1971 | Studtmann | 363/95 |
| 4,042,856 | 8/1977 | Steigerwald | 323/282 |
| 4,190,882 | 2/1980 | Chevalier et al. | 363/96 |
| 4,251,857 | 2/1981 | Shelly | 363/124 |
| 4,293,904 | 10/1981 | Brooks et al. | 323/282 |
| 4,636,927 | 1/1987 | Rhyne et al. | 363/95 |
| 4,661,896 | 4/1987 | Kobayashi et al. | 363/124 |
| 4,761,722 | 8/1988 | Pruitt | 363/124 |
| 4,763,237 | 8/1988 | Wieczorek | 363/124 |
| 4,779,185 | 10/1988 | Musil | 323/282 |

FOREIGN PATENT DOCUMENTS

| | | |
|---|---|---|
| 55-160485 | 12/1980 | Japan . |
| 59-65492 | 4/1984 | Japan . |
| 57/9236 | 2/1987 | Japan . |

*Primary Examiner*—Patrick R. Salce
*Assistant Examiner*—Jeffrey Sterrett
*Attorney, Agent, or Firm*—Armstrong, Nikaido Marmelstein, Kuvovcik & Murray

[57] ABSTRACT

A high frequency power unit having a switching regulator (12) and a high frequency inverter (13). The switching regulator (12) having a controlling portion (122) which outputs a control signal having a predetermined frequency which signal is intermittently in an "ON" state, and the duration of the "ON" state of the signal can be arbitrarily set; a switching portion (121) which receives a dc current, and outputs intermittent pulses by periodically passing through and interrupting the dc current according to the state of the control signal; and a rectifying and smoothing portion (123) which rectifies and smoothes the output of the switching portion (121) and transforms the outputs of the switching portion (121) to a dc current. The high frequency inverter (13) transforms the dc current to a high frequency current. (FIG. 6) Thereby the high frequency power unit is useful for a pulsed generation of a laser output.

2 Claims, 5 Drawing Sheets

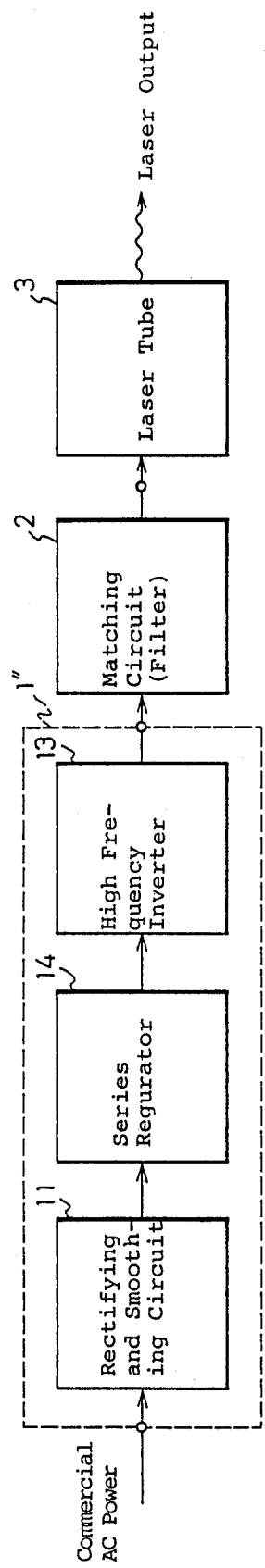
Fig.4
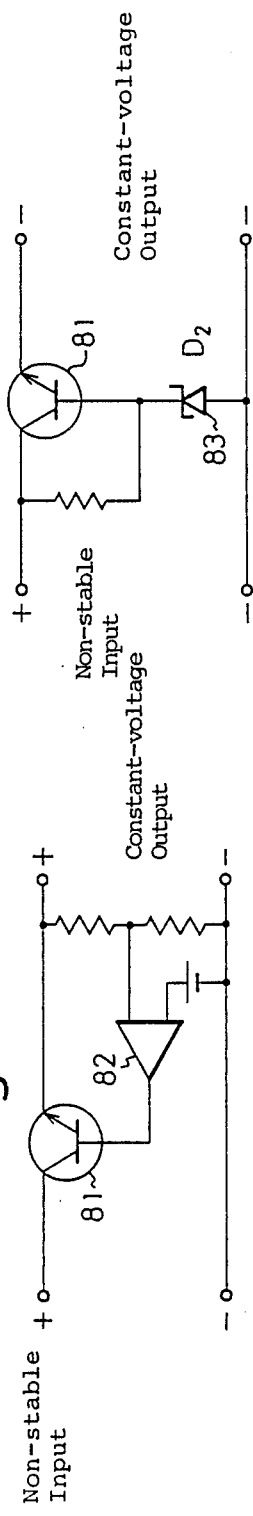
Fig.5A
Fig.5B

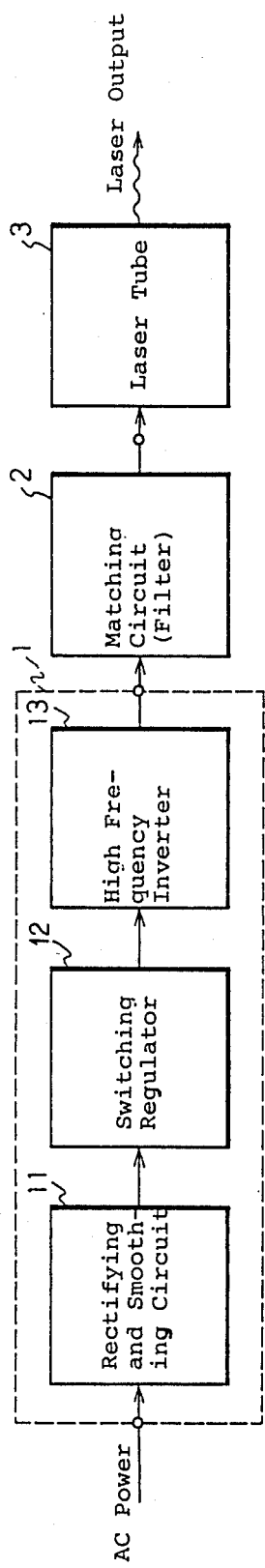
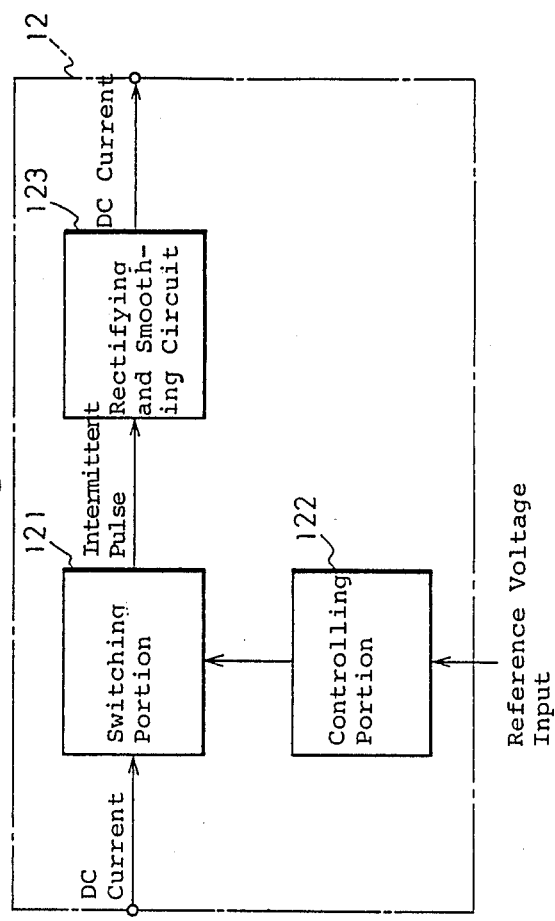

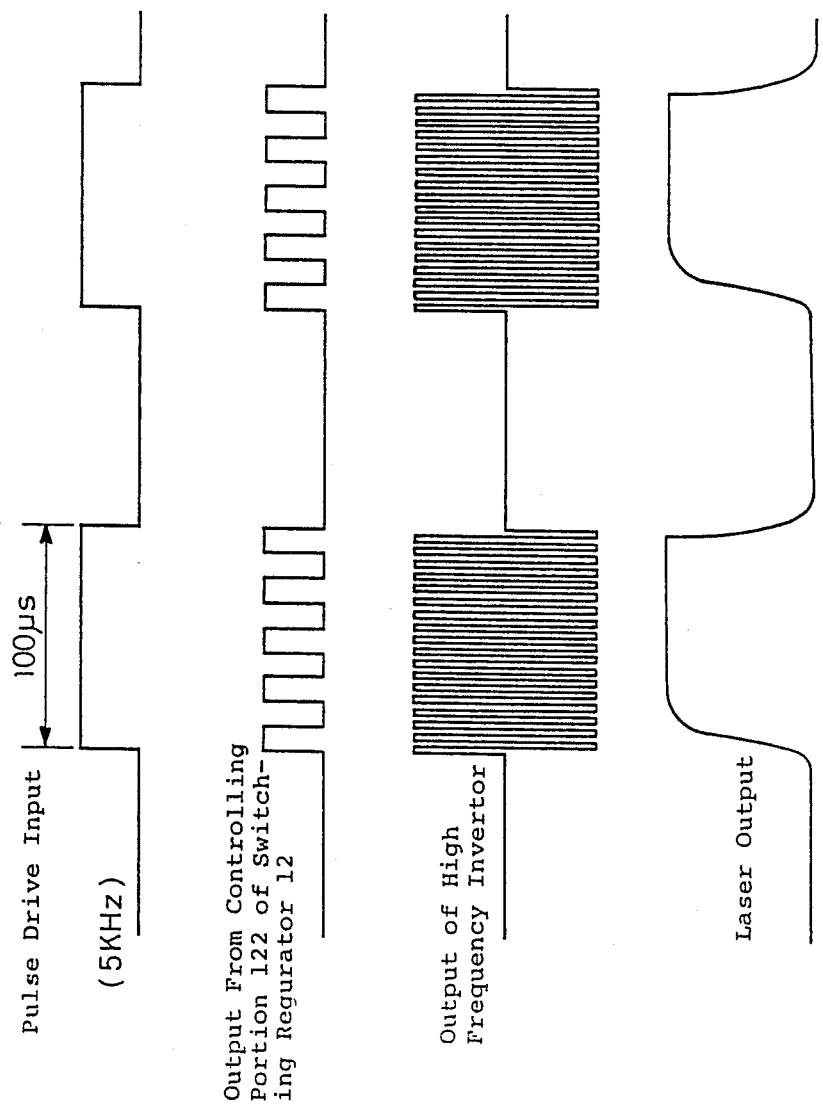

under ac voltages having frequencies of 100 KHz and below are provided.

HIGH FREQUENCY POWER UNIT FOR GENERATING GAS LASERS

TECHNICAL FIELD

The present invention relates to a high frequency power unit, more particularly, it relates to a high frequency power unit for generating all kinds of gas lasers, such as a $CO_2$-, He-, Ne-, CO-, or excimer laser.

BACKGROUND ART

In the field of ac discharge laser, conventionally laser apparatuses using a silent discharge (ozonizer discharge) under ac voltages having frequencies of 100 KHz and below are provided.

The present inventor has created a high frequency power unit for generating a gas laser, in which a power supply per unit volume has been increased by applying ac voltages having higher frequencies of several hundreds KHz~several tens MHz, and further, has reduced the size of the unit by using solid state components.

FIG. 1 shows a conventional construction of a high frequency power unit for generating a gas laser 1', which is used in the prior art apparatus for generating a laser. The high frequency power unit for generating a gas laser 1' comprises a rectifying and smoothing circuit 11 and a high frequency inverter 13. The rectifying and smoothing circuit 11 rectifies and smoothes an ac current to dc current. FIG. 2 shows the construction of an example of the rectifying and smoothing circuit 11. The high frequency inverter 13 transforms a dc current to a high frequency current. FIG. 3 shows the construction of an example of the high frequency invertor 13. The matching circuit 2 in FIG. 1 is provided for matching the output impedance at the output terminals of the high frequency invertor 13 and the input impedance at the input terminals of a laser tube 3. The matching circuit 2 is realized, for example, by a II-type filter. The wave shape of the high frequency output of the matching circuit 2 is similar to the shape of a sine wave, and the high frequency output is applied between the two electrodes of the laser tube 3.

No problem arises when the high frequency power unit for generating a gas laser 1' shown in FIG. 1 is used in the continuous output mode (CW mode), but, a high speed control of the high frequency power unit for generating a gas laser 1' is impossible.

An intermittent laser output, having a frequency of a maximum of 5 KHz, is often required in the field of laser beam machining. For example, when cutting or machining copper or aluminium, it is necessary to apply a pulsed (intermittent) laser output having a high intensity to instantaneously melt the material, and thereby improve the absorption rate of the laser beam. But it is impossible to control (pulsed drive) the laser output at a frequency as high as 5 KHz.

As shown in FIG. 2, a commercial ac current is rectified and smoothed in the smoothing circuit which consists of a coil and a condenser for smoothing ripples in the current rectified from the ac current having the commercial power frequency (50 Hz), in the rectifying and smoothing circuit 11 in FIG. 1. Accordingly, it is impossible to control the output at high speed in the power supply apparatus shown in FIG. 1.

To solve the above problem, a high frequency power unit for generating a laser 1" as shown in FIG. 4, in which a series regulator 14 is provided between the rectifying and smoothing circuit 11 and the high frequency invertor 13, is currently used. Two examples of the construction of this series regulator are shown in FIGS. 5A and 5B.

It is possible to control (pulsed drive) the laser output at a frequency such as 5 KHz, for example, by applying the pulsed input to the base terminal of the transistor to output a constant voltage in the series regulator as shown in FIGS. 5A or 5B.

Nevertheless, because a load and a transistor for voltage control are generally connected in series in a series regulator, the power consumption in the transistor is high, and therefore, the efficiency of utilizing electric power is low, and further, a heat sink is necessary to absorb heat generated in the transistor, which enlarges the size of the power unit.

DISCLOSURE OF THE INVENTION

An object of the present invention is to provide a high frequency power unit which is controllable at a high speed and in which the power consumption is low.

A high frequency power unit according to the present invention, comprises a switching regulator and a high frequency inverter: the switching regulator having a controlling portion, a switching portion, and a rectifying and smoothing portion; the controlling portion outputting a control signal having a predetermined frequency, which signal is intermittently in an "ON" state, and the duration of the signal "ON" state can be arbitrarily set; the switching portion receiving a dc current, and outputing intermittent pulses by periodically passing through and interrupting the dc current according to the state of the control signal; and the rectifying and smoothing portion rectifying and smoothing the output of the switching portion and transforming the output of the switching portion to a dc current; and the high frequency inverter transforming the dc current from the switching portion to a high frequency current.

BRIEF DESCRIPTION OF THE DRAWING

FIG. 4 shows the construction of a second example of the prior art high frequency power unit for generating a laser;

FIGS. 5A and 5B show the constructions of two examples of the series regulators used in the prior art high frequency power units for generating a laser shown in FIG. 4;

FIG. 6 shows an outline of a high frequency power unit according to the present invention, and an outline of an high frequency power unit according to the present invention for generating a laser;

FIG. 7 shows an outline of the switching regulator;

BEST MODE FOR CARRYING OUT THE INVENTION

Figure 1:
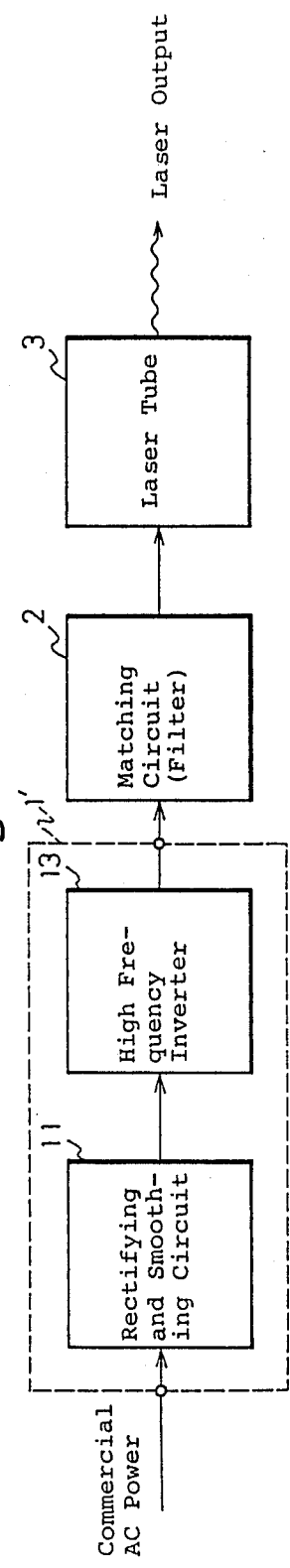
FIG. 1 shows the construction of a first example of a prior art high frequency power unit for generating a laser.

FIG. 6 shows a basic construction of the high frequency power unit according to the present invention, together with an additional construction for generating a laser. The main part of the high frequency power unit according to the present invention consists of a rectifying and smoothing circuit 11, a switching regulator 12, and an high frequency inverter 13, as shown by the dashed line in FIG. 6. The rectifying and smoothing circuit 11 rectifies and smoothes an ac current supplied by a commercial ac power line, and outputs the resultant dc current to the switching regulator 12.

The switching regulator 12 has the construction as shown in FIG. 7. The switching regulator 12 consists of a controlling portion 122, a switching portion 121, and a rectifying and smoothing portion 123.

The controlling portion 122 outputs a control signal having a predetermined frequency, which signal becomes intermittently "ON", and the duration of the "ON" state of the signal at each cycle can be arbitrarily set. An example of a more detailed construction will be described later.

The switching portion 121 receives a dc current from the rectifying and smoothing circuit 11, and outputs intermittent pulses by periodically passing through and interrupting the dc current according to the state of the control signal. For example, the switching portion 121 comprises a field effect transistor (FET) which receives the control signal as a gate input.

Figure 2:
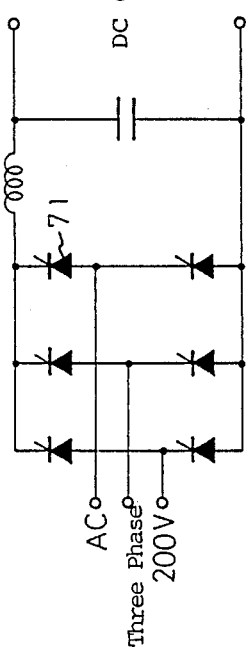
FIG. 2 shows the construction of an example of a rectifying and smoothing circuit.

The rectifying and smoothing portion 123 rectifies and smoothes the output of the switching portion 121, and outputs it as a dc current. The rectifying and smoothing portion 123 has a construction similar to the construction of the rectifying and smoothing circuit 11 shown in FIG. 6, except that the construction using the thyristors 71 for rectifying a three-phase ac current in FIG. 2 is replaced by a well-known construction using thyristors for rectifying a single-phase ac current, and the induction coil and the capacitor are selected so that the output from the switching portion 121 having the predetermined frequency can be made smoothed.

Figure 3:
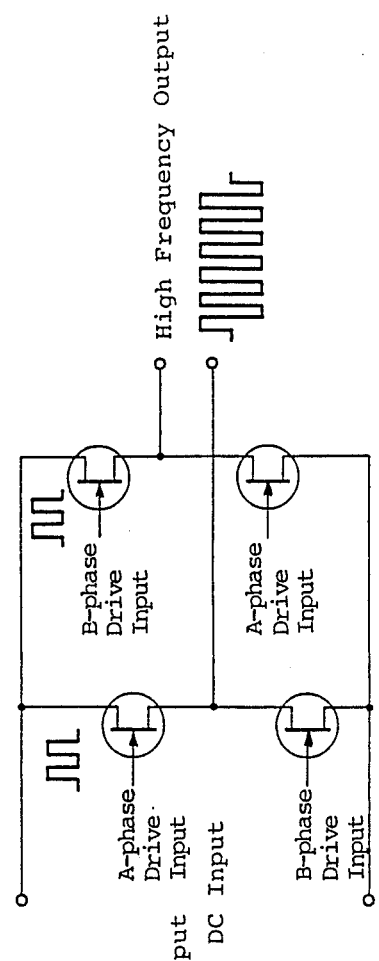
FIG. 3 shows the construction of an example of a high frequency inverter.

The high frequency inverter 13 in FIG. 6 receives the output of the dc current from the switching regurator 12, and transforms it to a high frequency current. The construction of FIG. 3 can be used as a high frequency inverter 13 in FIG. 6.

The output of the main part of the high frequency power unit according to the present invention, as enclosed by a dashed line 1 in FIG. 6, is applied to the electrodes of the laser tube 3 through the matching circuit 2, which is similar to the matching circuit in the conventional construction in FIG. 1.

When the frequency of the control signal in the controlling portion 122, which controls the "ON" and "OFF" of the switching portion 121, is set much higher than the frequency of the pulsed drive of the high frequency power unit in which the switching regulator 12 is incorporated, e.g., the frequency of the control signal in the controlling portion 122 is set at 50 KHz for a pulse driving of 5 KHz, the pulsed drive of the high frequency power unit can be carried out without problems, i.e., the high frequency power unit in FIG. 6 is controllable at a high speed.

Further, the electric power loss in the switching portion 121 is very small. This is inherent to a switching regulator.

Figure 8B:
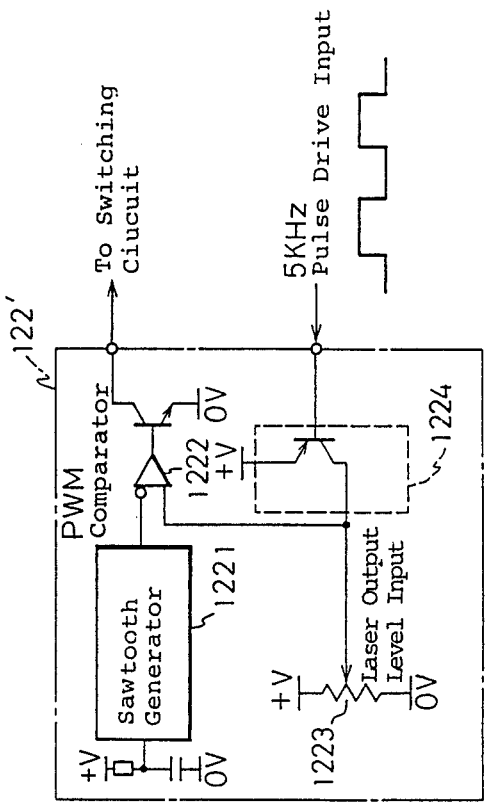
FIG. 8B shows the construction of an example of the controlling portion 122' in the switching regulator 12 in FIG. 7, having a pulse drive input portion 1224; and, FIG. 9 shows the wave shapes in the construction of FIG. 6, when pulsed driven (5 KHz).
Figure 8A:
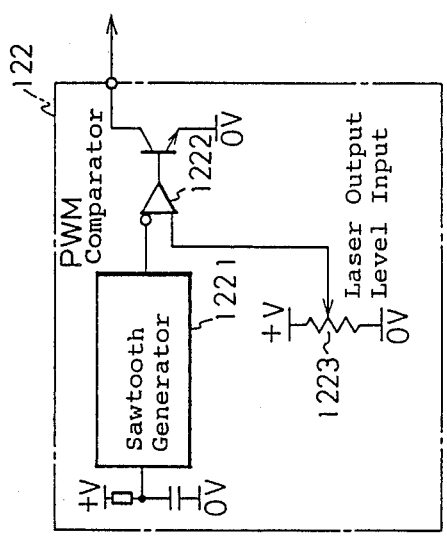
FIG. 8A shows the construction of an example of the controlling portion 122 in the switching regulator 12 in FIG. 7.

FIGS. 8A and 8B show an example of a more detailed construction of the controlling portion 122 in FIG. 7.

The controlling portion 122 in FIG. 8A comprises a sawtooth generator 1221, a PWM (Pulse Width Modulation) comparator 1222, and a potentiometer 1223 for setting a current output level from the high frequency power unit, i.e., a laser output level. The PWM (Pulse Width Modulation) comparator 1222 outputs an "H" level only when the level of the output of the sawtooth generator 1221 exceeds a threshold level, i.e., a set voltage in the potentiometer 1223 corresponding to the current output level from the high frequency power unit, i.e., a laser output level. Therefore, the width of the output pulse of the controlling portion 122 in the switching regulator 12 is determined by the set voltage in the potentiometer 1223. The resultant laser output is determined by the set voltage in the potentiometer 1223, because the dc current level output from the switching regulator is determined by the duration of the "ON" state at each cycle in the output of the switching portion 121.

FIG. 8B shows the construction of the controlling portion 122', which is obtained by adding a pulsed drive input portion 1224 to the construction of the controlling portion 122 in FIG. 8A. When an "H" level is input to the base terminal of the transistor in the pulsed drive input portion 1224, the threshold level of the PWM (Pulse Width Modulation) comparator 1222 becomes "H" level, and the output of the controlling portion 122' then becomes "L" level, and therefore, the switching portion 121 becomes "OFF".

When the filter parameters in the rectifying and smoothing portion 123 in the switching regulator in FIG. 7 are set so that the output of the sawtooth generator 1221, for example, having a frequency of 50 KHz, can be made smooth, the switching regulator can satisfactorily respond to a switching input of, for example, 5 KHz.

FIG. 9 shows the wave shapes of the pulsed drive input having a frequency of 5 KHz and the outputs of the main parts of the laser apparatus including the high frequency power unit. The output of the controlling portion 122 of the switching regulator 12 immediately responds to the pulsed drive input having a frequency of 5 KHz, which input is "ON" for 100 μs, and the controlling portion 122 outputs rectangular waves having a frequency of 50 KHz for that duration of 100 μs. The output of the high frequency inverter 13 responds to the output the switching regulator 12, and as a result, the pulsed laser output as shown in FIG. 9 is obtained.

INDUSTRIAL APPLICABILITY

The high frequency power unit according to the present invention is, in particular, useful as a high frequency power unit for generating gas lasers used in metal working.

I claim:

1. A high frequency power unit, comprising a switching regulator; and a high frequency inverter, wherein said switching regulator comprises a controlling portion which receives a pulse drive frequency input, a switching portion and a rectifying and smoothing portion, wherein said controlling portion outputs a control signal having a predetermined frequency which is substantially higher than the frequency of said pulse drive frequency input, and said signal being intermittently in an "ON" state, and the duration of the "ON" state of the signal can be arbitrarily set, wherein said switching portion receives a dc current, and outputs intermittent pulses by periodically passing through and interrupting the dc current according to the state of the control signal, and wherein said rectifying and smoothing portion rectifies and smooths the output of the switching portion and transforms the output of the switching portion to a dc current, and wherein the high frequency inverter transforms the dc current from the switching portion to a high frequency current.

2. A high frequency power unit according to claim 1, wherein said controlling portion comprises: a sawtooth generator which outputs a saw tooth wave having said predetermined frequency; a potentiometer for setting a current output level from the high frequency power unit; a comparator which compares the output level of said sawtooth generator with the output level of said potentiometer; and a switching device which changes the output level of the potentiometer to a pulse form according to a pulsed drive input from outside.

* * * * *